Jan. 8, 1957  A. VANG  2,777,046
JOINING ENDS OF WIRES
Original Filed July 2, 1947
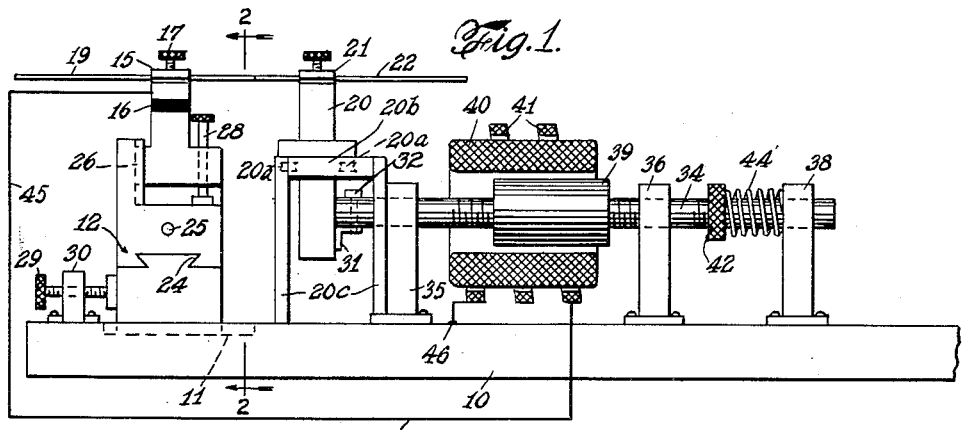
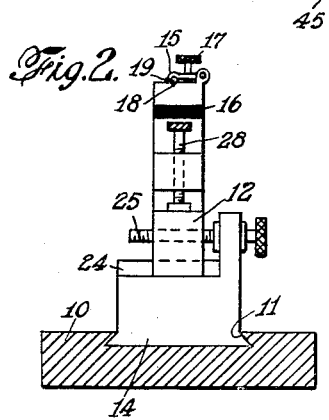
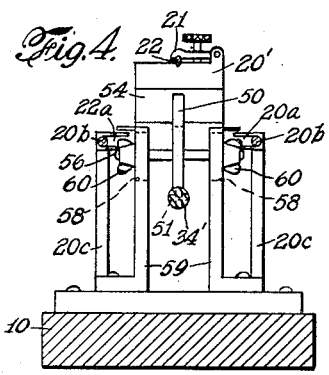
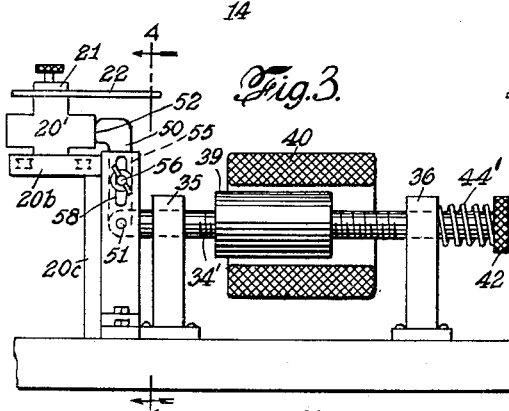
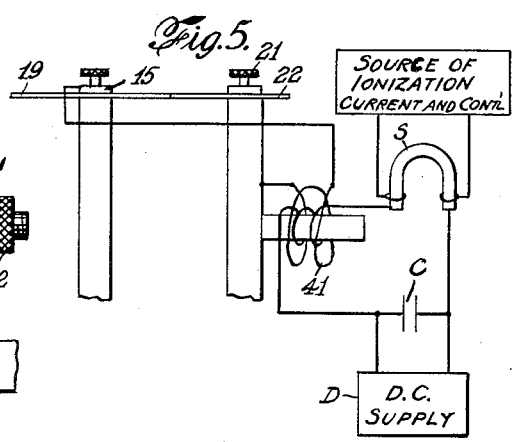
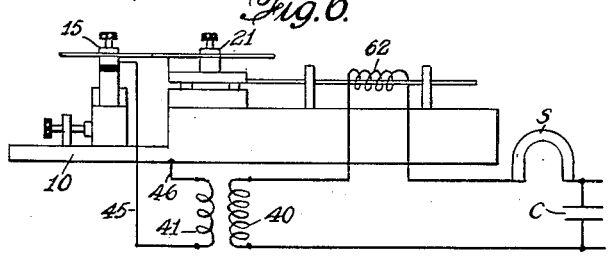
INVENTOR.
ALFRED VANG
BY Peter M. Boesen
ATTORNEY.

United States Patent Office 2,777,046
Patented Jan. 8, 1957

2,777,046

JOINING ENDS OF WIRES

Alfred Vang, Carmel, Calif.

Substituted for abandoned application Serial No. 758,579, July 2, 1947. This application August 6, 1953, Serial No. 372,640

1 Claim. (Cl. 219—104)

This application is a substitute application for the abandoned application Serial Number 758,579, filed July 2, 1947.

This invention relates to the joining of ends of wire and more particularly to the butt welding of wires of indefinite lengths by low voltage high frequency currents of short duration.

During the process of wire making it is necessary to join additional wire to a coil or reel to procure a continuous wire of a certain length, say a thousand feet. Also in the drawing of wire, when large wire stock is reduced or drawn it has been usual to draw a given length of stock into whatever length results from the particular amount of stock at hand with little or no attempt to join successive length of stock.

Numerous attempts have been made heretofore to weld wire ends in a manner suitable to the industry. The attempts have resulted in welds of inferior quality in one way or another. If the wire end-portions were well heated to attain a sufficient contact of the ends the weld formed an upset which precluded further drawing, and, the weld was brittle until annealed. Thus the characteristics of cold drawn wire were changed so that the annealing process had to be regulated to remove the abnormal characteristics of both the wire and the weld.

In order to prevent upset and crystallization of the weld it was proposed to connect the wire ends to respective sides of a condenser to form a high voltage arc between the wire ends and almost immediately force the two ends together by mechanically applied force. Not only was this procedure dangerous to the operator but the welds could not be made to cover the entire cross section of the wire. It was found that an appreciable area was not welded at the outer periphery of the joint and that a narrow annular groove persisted around the wire. The resulting reduction of cross sectional area reduces the tensile strength of the wire, causes hot spots and increases corrosion in electrical circuits and leaves the wire susceptible to rupture upon being bent.

One object of the present invention is, therefore, to provide means and methods for the uniform butt welding of ends of wire producing an upset.

Another object of my invention, is to provide a means for synchronizing welding current and pressure upon a wire weld.

A further object is to provide a means for applying a high frequency welding current to the wire ends without danger to the operator.

A still further object is to provide a wire weld of substantially the same cross-sectional area, tensile strength, and non-crystalline characteristics as the remainder of the wire.

Yet another object is to utilize the principle of my welder as described in my United States patent application, Serial No. 580,648, filed March 2, 1945, now Patent No. 2,473,772, dated June 21, 1949, for the welding of the ends of wire.

For attaining these objects I have provided a welder for wire, which briefly stated, includes two clamping means for alining the ends of wire, one of which is movable toward the other, and means for applying a magnetic impulse to the movable means nearly simultaneously with an application of high frequency current to the wire ends.

In the accompanying drawing showing, by way of example, two of many possible embodiments of the invention, Figure 1 is a front elevation of the invention.

Figure 2 is a tranverse vertical sectional view of the invention, the section being taken along the line 2—2 of Figure 1, looking in the direction of the arrows of said line.

Figure 3 is a fragmental front elevation showing a modification of the invention.

Figure 4 is a transverse vertical sectional view of the invention as shown in Figure 3, the section being taken along the line 4—4 of Figure 3, looking in the direction of the arrows of said line.

Figure 5 is a diagrammatic representation of means for energizing the wire welder, and Figure 6 is a representation of another means for energizing the welder.

The wire joiner comprises a long bed plate 10, having an undercut upwardly open groove or way 11 in one end portion thereof. A tail piece generally designated 12 having a flared base 14 (Figure 2), received in the undercut groove, is adapted to slide therein lengthwise of the bed plate without tilting in any direction. Secured on the top of the tail piece 12 is a clamp 15 insulated from the remainder of the tail piece by rigid insulation 16 and preferably provided with a V slot 18 into which may be laid the end portion of one wire 19 and clamped by means such as a screw 17.

An opposed head piece 20 having a clamp 21 thereon and similar to clamp 15 is adapted to receive another end portion of wire 22, and is movable toward and from the tail piece 12.

The head piece 20 is provided with wheels 20a engaging with a stationary track 20b suitably mounted on the bed plate as by supports 20c. The head piece should not tilt vertically or laterally.

The two clamps 15 and 21 are substantially in alinement but in order to aline the ends of the wires 19 and 22 accurately, means are provided for laterally and vertically moving one of the clamps such as clamp 15. Various means for accomplishing such movement of the clamp may be employed but it is desirable that the clamp maintain the wire 19 in the same position under a pressure applied along the axis of the wire. Therefore a lateral gibslide means 24 is provided in the tail piece whereby the lateral position of the clamp 15 may be adjusted by an adjusting screw 25 and a similar slide means 26 shown in dotted lines in Figure 1, and screw 28 enables vertical adjustment of the clamp and wire position. Longitudinal adjustment of the clamp and wire position is likewise obtained by means of a screw 29 passing in threaded engagement through a block 30 fixed on the bed plate.

Attached to the outer end face of the head piece 20 by means of bracket 31 and pin 32 is a horizontal rod 34 longitudinally slidable in supports 35, 36 and 38. A solenoid core 39 adjustably mounted coaxially on the rod 34 is surrounded by a solenoid coil 40 comprising the primary of a transformer having a secondary 41 of a few coarse turns, both the primary and the secondary being fixed with respect to the bed plate. On the outer end portion of the rod is an adjusting nut 42 threaded thereon for adjustably compressing a spring 44 against the support 38, whereby the spring lightly urges the rod and head piece toward the tail piece. The terminal ends of the secondary are electrically connected respectively to the clamps 15 and 21 as by a conductor from one end 45 to clamp 15 and by grounding the other end as at 46.

As means for energizing the transformer I prefer to employ a condenser C (Figure 5) which is discharged through the primary coil 40 by means of a mercury arc tube-switch B described in my Patent No. 2,287,541.

In operation the condenser C is charged by a source of direct current D, the head and tail pieces 21 and 12, respectively, slightly spread and wire end 19 and 22 clamped in clamps 15 and 21. After the manipulation of adjusting screws 25 and 28 to accurately aline the wire ends screws 29 and/or nut 42 are so adjusted to bring the wire ends into slight contact with each other. Then the contents of the tube-switch are ionized to render the tube conductive. The discharge current from the condenser, flowing through the coil 40, induces a high frequency welding current to flow through the secondary 41 and the lightly contacted ends of the wires 19 and 22. The high frequency nature of the current produces dielectric heating of any oxide film on the wire ends at the points of contact. Almost simultaneously with the induction of the welding current into the secondary the flux produced in the transformer impels the core 39, rod 34, and head piece 21 toward the tail piece so that a magnetic forging pressure is created on the ends of the wire. Since the period of heating is restricted to a single discharge of the condenser the surface of the wire ends are substantially the only portions of the wire heated and no upset of the weld is possible.

The quantity of energy stored in the condenser may be varied by means well known to the art so that for different sizes of wire to be welded a corresponding quantity of energy is used. Since the forging pressure or force is substantially proportional to the welding current, the pressure on the wire ends is more or less automatically controlled by merely selecting the proper amount of energy to be stored in the condenser for making the weld. This is especially important in the welding of wire since excessive forging pressure causes the wires to bend and form a kinked weld.

In another form of the invention I may provide means for multiplying or reducing the forging pressure produced by the reaction of the magnetic flux on the solenoid core. Thus, as shown in Figures 3 and 4, I may employ a lever 50 pivoted at the lower end thereof, as at 51, to a rod 34' slidable through the supports 35 and 36 and carrying the core in a manner similar to that described for rod 34 except that the core projects from the opposite end of coil 40. The upper end portion of the lever is provided with a nose 52 adapted to engage the outer face at 54 of head piece 20' which is otherwise similar to the head piece 20, except that the lower portion has been omitted. The midportion of the lever is provided with a longitudinal slot 55 through which passes a cross pin or fulcrum 56. The cross pin is received in vertical slots 58 provided in mounting brackets 59 secured on the bed plate 10. The vertical position of the cross pin is fixed by drawing wing nuts 60 threaded on each end thereof tight up against the outer faces of the brackets 59. The position of the cross pin determines the effective length of the arms of the lever 50. A spring 44' is compressed between the support 36 and the adjusting nut 42 for lightly urging the head piece 20' toward the tail piece. In operation, the magnetic flux augments the force of the spring 44' in a manner similar to that described for Figure 1 except the direction of motion of rod 34' is opposite to that of rod 34.

Many additional features may be added to facilitate operation of the welder and of course many other changes will be apparent to those skilled in the art. For example, by way of illustration only, the bracket and pin 31 and 32 may be omitted.

I have found that welding current frequencies of the order of 250 C. P. S. at about 20 volts give satisfactory welds but these values are for illustration only for frequencies of the order of 5,000 C. P. S. produce welds and voltages may be lowered and of course raised to almost any degree provided human safety is duly regarded. The duration of the current may be considered for all practical purposes as only one cycle since the energy of the condenser is quickly dissipated.

While I prefer to utilize the flux of the transformer to actuate the core 39 it may be desirable at times to employ a coil which is not a part of the transformer for actuating the core. It may be found, for instance, that the size of the transformer prohibits its being mounted alongside the wire being welded, especially if the wire is large. Thus as in Figure 6 the transformer may be located in any convenient position such as below the bed plate or piece 10. Magnetic pressure upon the wire is obtained by the action of a solenoid coil 62 stationary with respect to the bed plate and serially connected with the primary 40. Another advantage resulting from the use of a separate solenoid coil is that the conductor 45, which must carry a large current, may be made shorter by locating the transformer near the clamps. While I have shown a separate solenoid coil in connection with the head piece 20 acting directly with the rod and core as in Figure 1 obviously I may use the coil 62 in an arrangement employing a mechanical linkage as shown in Figure 3.

The invention claimed is:

A method for welding two ends of wire comprising alining the end portions of the wire, providing substantially flat end surfaces to the wire, lightly engaging said surfaces with each other, then applying a high frequency current to said end portions to heat oxide on the same by dielectric heating and substantially simultaneously forcing the surfaces together by additional force.

References Cited in the file of this patent

UNITED STATES PATENTS

| | | |
|---|---|---|
| 1,267,254 | Murray et al. | May 21, 1918 |
| 1,327,814 | Fortescue | Jan. 13, 1920 |
| 2,018,379 | Pfeiffer | Oct. 22, 1935 |
| 2,018,380 | Pfeiffer | Oct. 22, 1935 |
| 2,023,085 | Lavalle | Dec. 3, 1935 |
| 2,023,086 | Lavalle | Dec. 3, 1935 |
| 2,159,916 | Vang | May 23, 1939 |
| 2,387,067 | Heath et al. | Oct. 16, 1945 |
| 2,464,967 | Dinnick | Mar. 22, 1949 |
| 2,473,772 | Vang | June 21, 1949 |

FOREIGN PATENTS

| | | |
|---|---|---|
| 123,320 | Great Britain | Aug. 7, 1919 |
| 414,864 | Germany | June 8, 1925 |